(12) United States Patent
McLeod

(10) Patent No.: US 11,959,731 B1
(45) Date of Patent: Apr. 16, 2024

(54) CIVILIAN HANDHELD PERSONAL DEFENSE AND ALARM DEVICE

(71) Applicant: Deborah S. McLeod, Monterey, CA (US)

(72) Inventor: Deborah S. McLeod, Monterey, CA (US)

( * ) Notice: Subject to any disclaimer, the term of this patent is extended or adjusted under 35 U.S.C. 154(b) by 0 days.

(21) Appl. No.: 18/167,360

(22) Filed: Feb. 10, 2023

(51) Int. Cl.
| | | |
|---|---|---|
| F41H 9/10 | (2006.01) | |
| F41H 13/00 | (2006.01) | |
| G08B 25/01 | (2006.01) | |
| G08B 25/10 | (2006.01) | |
| H04W 4/90 | (2018.01) | |

(52) U.S. Cl.
CPC ........... *F41H 9/10* (2013.01); *F41H 13/0018* (2013.01); *F41H 13/0025* (2013.01); *G08B 25/016* (2013.01); *G08B 25/10* (2013.01); *H04W 4/90* (2018.02)

(58) Field of Classification Search
CPC ............. F41H 13/0018; F41H 13/0025; F41H 13/0012; F41H 9/10
See application file for complete search history.

(56) References Cited

U.S. PATENT DOCUMENTS

| | | | | |
|---|---|---|---|---|
| 3,803,463 | A | | 4/1974 | Cover |
| 5,549,220 | A | * | 8/1996 | Whalen ............... F41H 13/0087 222/113 |
| 5,629,679 | A | * | 5/1997 | Cranford ................... F41H 9/10 340/693.8 |
| 5,786,546 | A | | 7/1998 | Simson |
| 6,052,051 | A | * | 4/2000 | Whalen ............... G08B 15/004 222/113 |
| D681,768 | S | * | 5/2013 | Ross, Jr. ...................... D22/117 |
| D688,769 | S | * | 8/2013 | Lord ........................... D22/117 |
| 9,250,044 | B1 | * | 2/2016 | Raring .................. H01S 5/1096 |
| 9,423,208 | B1 | | 8/2016 | Mahmalji |
| 2004/0184260 | A1 | * | 9/2004 | Kukuk ................ F41H 13/0018 362/399 |

(Continued)

OTHER PUBLICATIONS

Taser International; Certification Lesson Plan Taser x26 Advanced Taser M26; Jul. 2, 2022; https://web.archive.org/web/20200702155418/ https://www.prisonlegalnews.org/media/publications/taser_intl_ certification_plan_full.pdf (Year: 2020).*

*Primary Examiner* — Joshua E Freeman
(74) *Attorney, Agent, or Firm* — Stephen E. Zweig

(57) ABSTRACT

A handheld personal security device comprising a computer processor, at least one trigger switch, noise generator, wireless transceiver, a directional defensive mechanism, and an electronic camera having a field of view. The defensive mechanism projects at least one defensive agent along the field of view. This agent can be a chemical spray or high-voltage low-current electrical charge. The device is configured so that activation of the trigger switch automatically activates the at least one defensive mechanism and the electronic camera. The device processor is also configured, when triggered, to use this camera to obtain at least one image of the field of view, and use its wireless transceiver to wirelessly transmit this image to an external computerized device or 911 emergency call system. Further, when triggered, the security device is also configured to activate its noise generator, which can produce at least one sound with an intensity exceeding 100 decibels.

20 Claims, 3 Drawing Sheets

(56) References Cited

U.S. PATENT DOCUMENTS

| | | | | |
|---|---|---|---|---|
| 2006/0086032 A1* | 4/2006 | Valencic | ............... | H05C 1/06 |
| | | | | 42/70.01 |
| 2006/0256498 A1* | 11/2006 | Smith | ............... | F41H 13/0031 |
| | | | | 361/232 |
| 2007/0039226 A1* | 2/2007 | Stokes | ............... | F41G 1/35 |
| | | | | 42/146 |
| 2007/0070574 A1* | 3/2007 | Nerheim | ............... | F41H 13/0025 |
| | | | | 361/232 |
| 2007/0086190 A1* | 4/2007 | Kukuk | ............... | F41C 23/10 |
| | | | | 362/253 |
| 2007/0194048 A1* | 8/2007 | Teig | ............... | H04N 7/185 |
| | | | | 222/113 |
| 2008/0010888 A1* | 1/2008 | Nerheim | ............... | F41H 13/0018 |
| | | | | 361/232 |
| 2011/0002077 A1* | 1/2011 | Brundula | ............... | F41H 13/0025 |
| | | | | 361/232 |
| 2014/0098453 A1* | 4/2014 | Brundula | ............... | F41H 5/24 |
| | | | | 361/232 |
| 2014/0252028 A1* | 9/2014 | Lord | ............... | G08B 21/02 |
| | | | | 222/162 |
| 2016/0165192 A1* | 6/2016 | Saatchi | ............... | H04N 7/185 |
| | | | | 386/227 |
| 2017/0248388 A1* | 8/2017 | Young | ............... | F41A 17/063 |
| 2017/0268842 A1* | 9/2017 | Kennair, Jr. | ............... | F41A 17/063 |
| 2018/0051963 A1* | 2/2018 | Kushneryk | ............... | G08B 15/02 |
| 2018/0216909 A1* | 8/2018 | Thomann | ............... | F41B 9/0062 |
| 2019/0271527 A1* | 9/2019 | Nangunoori | ............... | G08B 15/004 |
| 2019/0271528 A1* | 9/2019 | Nangunoori | ............... | F41H 9/10 |
| 2020/0378728 A1* | 12/2020 | DeCamp | ............... | B44F 1/00 |
| 2022/0013001 A1* | 1/2022 | Thomas | ............... | H04N 5/772 |
| 2022/0252368 A1* | 8/2022 | Dugo | ............... | F41H 13/0087 |

\* cited by examiner

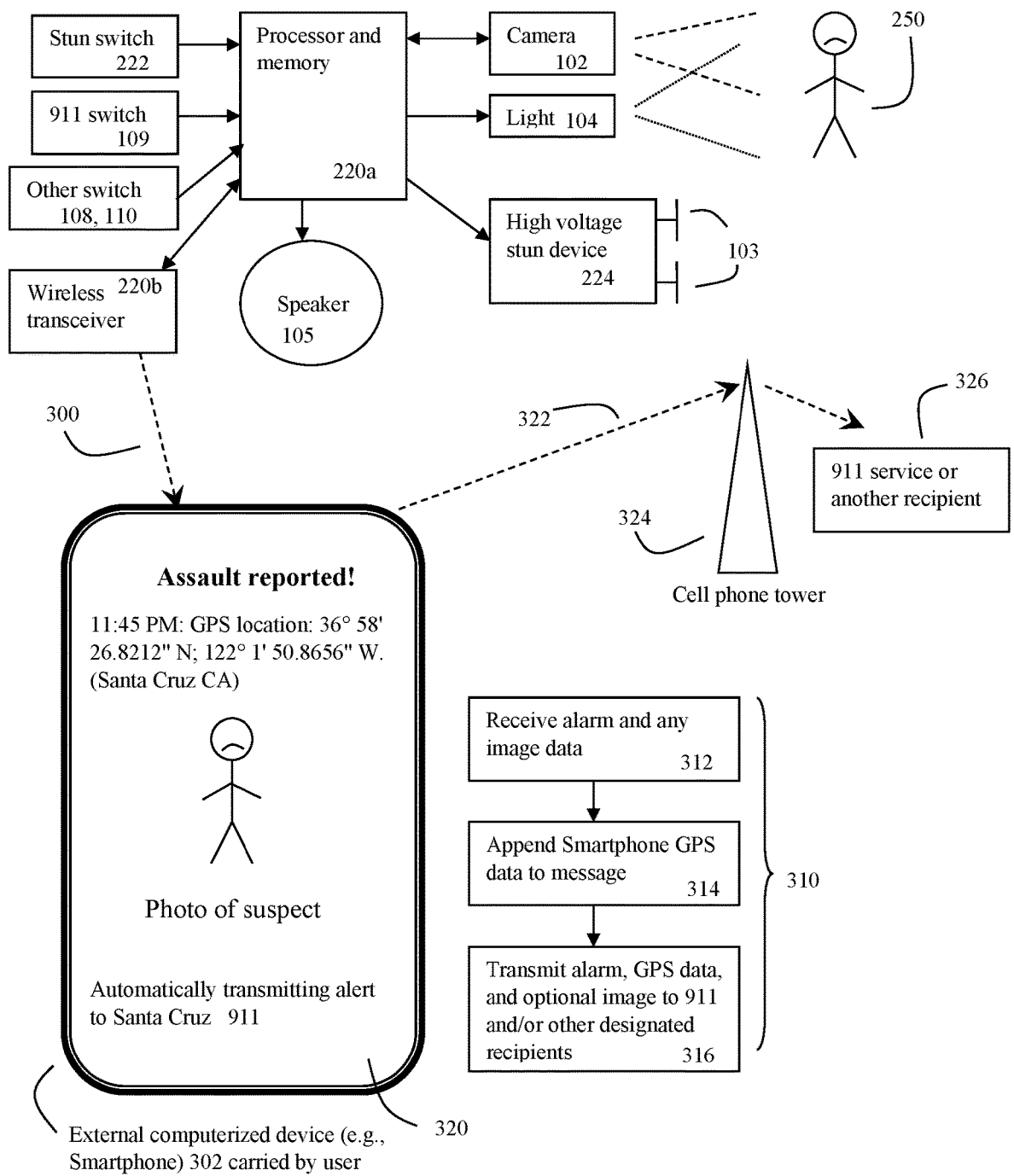

CIVILIAN HANDHELD PERSONAL DEFENSE AND ALARM DEVICE

BACKGROUND OF THE INVENTION

Field of the Invention

This invention is in the field of civilian-grade handheld personal security devices, including handheld chemical sprays and handheld electronic stun guns. This invention is also in the field of civilian grade personal alarm devices, such as audio and radio alarm devices.

Description of the Related Art

Personal self-defense devices: Although personal security devices for military or police use, such as guns, chemical weapons, tear gas, tasers, and the like have been used for decades or even centuries, such weapons are often problematic for civilian use. Even in states where personal carry laws enable concealed weapons, the civil and criminal liability of inappropriate use is quite high.

However, the law often permits use of non-lethal force for self-protection. In recent years, there has been a significant amount of commercial interest in civilian grade self defense devices. Although the laws vary on a state-by-state basis, uses of limited amounts and concentrations of chemical sprays, such as pepper sprays, is often permitted. So, to, use of limited amounts of electrical energy, such as civilian grade stun guns, is often also permitted for civilian self-defense purposes.

Personal alarm devices: A number of alarm devices for civilian use are also known. These include sonic alarm devices, such as hand carried whistles and air horns, as well as longer range radio alert devices. Many modern smartphones, and smart watches, for example, can be configured with various cellular or Wi-Fi alarm mechanisms that can automatically call a distress agency, such as a private or public service, when triggered.

Despite these advances, a large percentage of the population still lives in fear for their personal security, thus further advances would be desirable.

BRIEF SUMMARY OF THE INVENTION

The invention was inspired, in part, by the insight that a significant number of attacks are sudden and unexpected. Thus, the victim may only have a few seconds to react, and is unlikely to have the time or presence of mind to simultaneously defend themselves, adequately summon help, and record information about the attacker.

The invention was further inspired, in part, by the insight that although non-civilian grade self-defense devices are problematic for normal civilian use, a single type of civilian grade self-defense device will often be too gentle to reliably deter a determined attacker. In this regard, a civilian grade handheld self-defense device that employed more than one type of self-defense mechanism would likely be more effective.

The invention was also inspired, in part, by the insight that it is unrealistic to expect an attack victim to instantly choose between sounding an effective alarm and defending themselves. Ideally, what is needed is a self-defense device that also automatically produces an effective alarm when activated.

What is an "effective" alarm, however? A sonic alarm alone is not always effective at summoning assistance, since often responders may not be within earshot. A radio alarm, summoning help from a remote response site (such as a local 911 emergency call response agency), might also not be effective. This is because unless the alarm has good information, such as the GPS location of the alarm device, as well as additional information such as information about the attacker, the response agency may give adequate priority to the alarm. Further, even if an alerted 911 call center summons police or ambulance help immediately, it usually will take 5 minutes to an hour for any responder to actually reach the proper location. Thus, the invention is also based on the insight that an "effective" alarm should ideally have more than one alarm modality (e.g., sonic and radio). An effective alarm should ideally also append additional information to any radio signal for help.

Thus, in some embodiments, the invention may be a handheld, civilian-grade personal security device that can respond to an attacker with more than one civilian-grade defense response. Further, in some embodiments, when activated, the invention should also provide an effective, multi-mode (local sonic signal, plus remote radio signal) alarm, preferably annotated with additional information identifying location and attacker.

As will be discussed, in some embodiments, the invention may be a handheld personal security device comprising a computer processor, at least one trigger and/or other type switch, noise generator, wireless transceiver, a directional defensive mechanism, and an electronic camera having a field of view. The security device's defensive mechanism may be configured to directionally project at least one defensive agent, charge, or force in the same direction as this field of view.

In some embodiments, this at least one defensive agent can comprise any of a chemical spray and a high-voltage low-current electrical charge. The security device and the computer processor can typically be configured so that activation of this at least one trigger switch automatically activates the at least one defensive mechanism. Further, the same (or a different) triggering action can also activate the device's electronic camera. The device processor is configured, when triggered, to use this camera to obtain at least one image of the field of view, and also use its wireless transceiver to wirelessly transmit this at least one image to an external computerized device. Further, when triggered, the security device can also be configured to activate its noise generator, which should ideally produce at least one alarm type sound with an intensity exceeding 100 decibels.

In some embodiments, the handheld security device may be configured with a handheld grip with a grip axis, and a barrel with a barrel axis. The handheld grip is mounted to the barrel at an angle between 0 and 90 degrees. Thus, in some embodiments, the device may resemble a pistol, and in other configurations the device may resemble an umbrella, flashlight, or baton.

The barrel may typically be configured with a front region so that the at least one defensive mechanism directionally projects the at least one defensive agent away from the front region and along the barrel axis away from the handheld grip.

BRIEF DESCRIPTION OF THE DRAWINGS

FIG. 3 shows an embodiment of some of the major electrical components of the personal security device. FIG. 3 also shows how the personal security device can use a short-range wireless transceiver, such as a Bluetooth® or Wi-Fi transceiver, to wirelessly transmit alarm information to a nearby handheld computerized device (such as a smartphone). This smartphone or other handheld computerized device can be configured (such as with a software app) to annotate the alarm information with additional data, such as location (GPS) information, and then use the smartphone's longer range cellular transmitter to relay the annotated alarm to local emergency response services.

DETAILED DESCRIPTION OF THE INVENTION

In some embodiments, the invention may be a handheld personal security device (100), which may be configured to resemble either a handheld pistol, baton, flashlight, umbrella or other commonly carried handheld device.

Figure 1A:
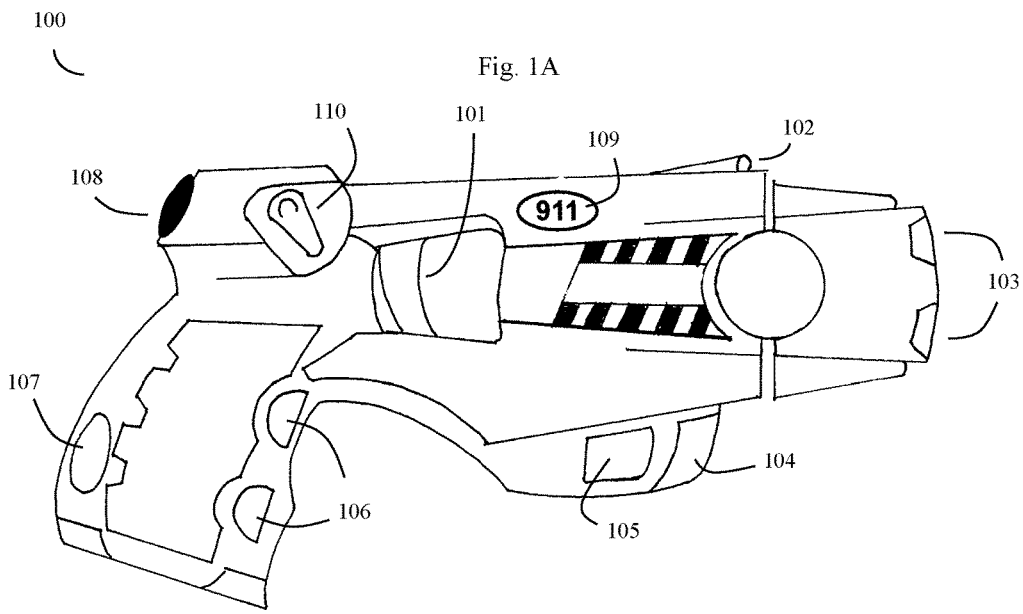
FIG. 1A shows an embodiment of the exterior of the personal security device.
Figure 1B:
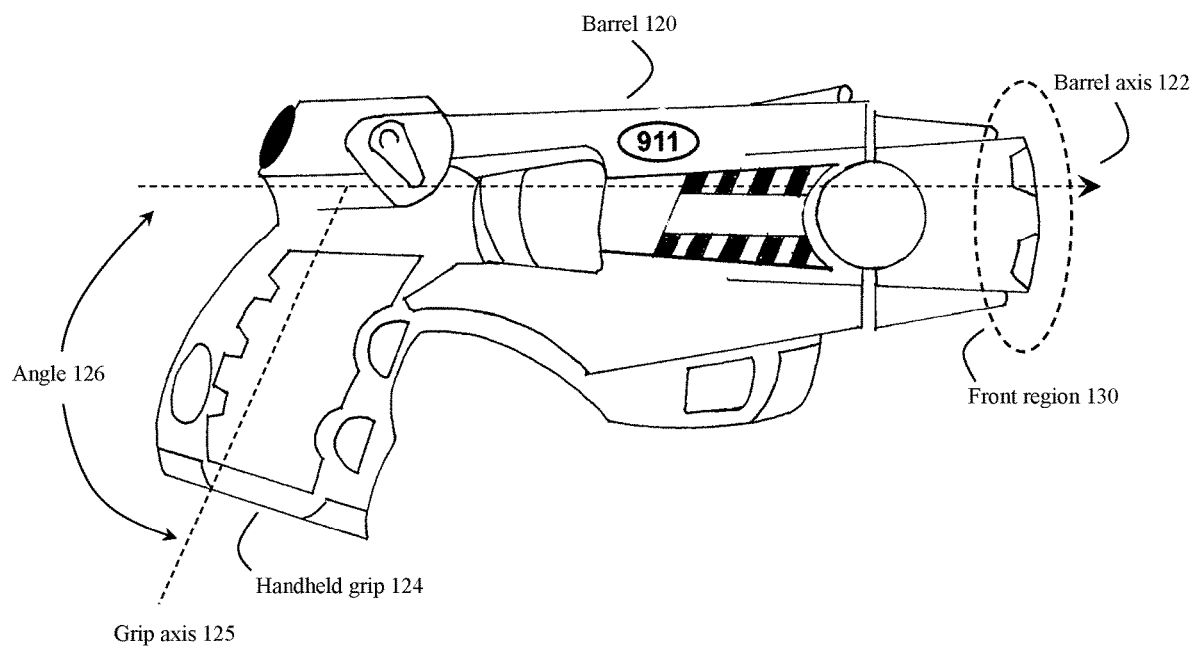
FIG. 1B shows additional details of the exterior of the personal security device.

FIG. 1A shows an embodiment of the personal security device exterior. FIG. 1B shows additional details of exterior of this personal security device. In this embodiment, the angle 126 between the grip axis (125) of the handheld grip (124) and the barrel axis (122) of the barrel (120) is set at about 75 degrees, giving the device a pistol like appearance. In other embodiments, this angle (126) may be set at 0 degrees, so that the handheld grip (124) and grip axis (125) form a straight line with the barrel (120) or barrel (axis), giving the device more of a baton, flashlight or folded portable umbrella appearance. Other angles between 0 and 180 degrees are possible, with but angles between 0 and 90 degrees are generally preferred embodiments.

Although in the embodiments shown, the angle (120) is set at a fixed 75 degrees, other embodiments with a flexible angle (120), are also taught. For example, in some embodiments, a user-adjustable hinge mechanism may be provided that enables the user to adjust the angle (120) to a range between 0 degrees to 90 degrees, thus enabling the user to select any of a pistol or baton-like shape depending on the user's preference.

Figure 2A:
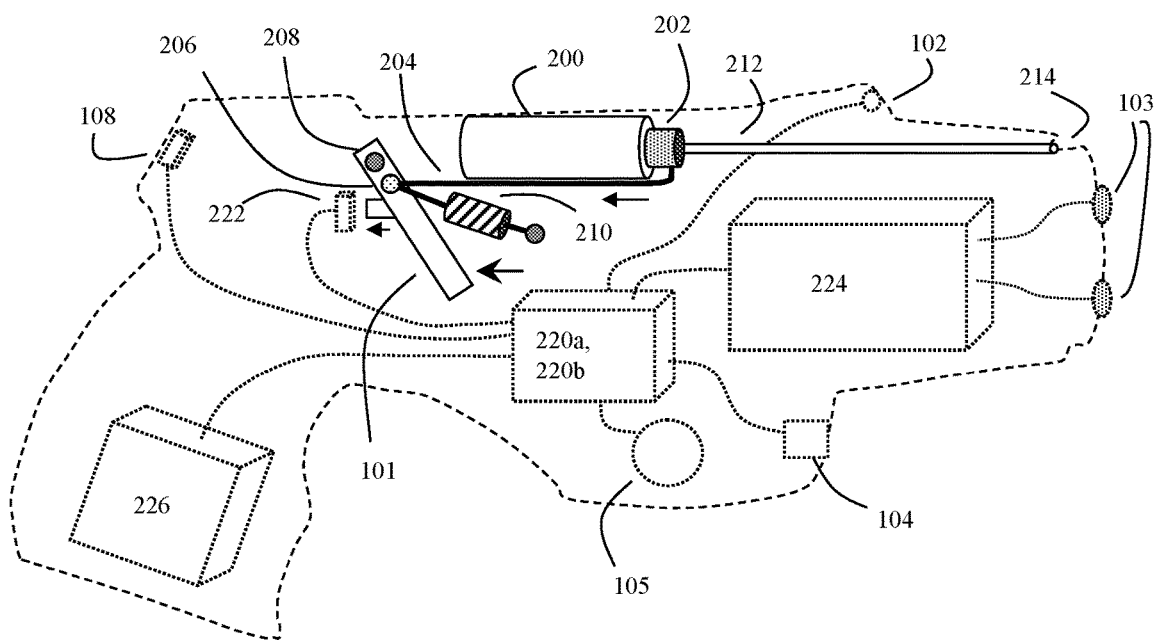
FIG. 2A shows an interior of the personal security device, showing an embodiment of the personal security device's chemical spray mechanism (solid lines). An embodiment of an alternative high voltage, low current "stun gun" mechanism is also shown (dotted lines).

As shown in more detail in FIG. 2A and FIG. 3, the device will typically comprise a computer processor (220a), trigger switch (101), noise generator (105), wireless transceiver (220b), at least one directional defensive mechanism (214 or 103), and an electronic camera (102) having a field of view (such as about 45 degrees to either side of the barrel axis (122).

Various types of computer processors may be used. In some embodiments, the ARM series of microprocessors (commonly used in smartphones and smartwatches) is advantageous, because such processors are energy efficient, have adequate processing capability, and are low cost. The device's memory may comprise both RAM, and ROM or Flash type memory. Since the device will often be configured to manage Bluetooth, Wi-Fi, and/or cellular communications, store image information, and produce sound signals, usually the memory will be in the megabyte range or more, and may often be hundreds of megabytes or higher. To reduce costs, often the microprocessor, memory, and even some or all of the various wireless transceivers may be located in the same chip or printed circuit module.

The at least one defensive mechanism (214), (103) is configured to directionally project at least one defensive agent in the same direction as the field of view (e.g., in the same direction as the barrel axis 122). This at least one defensive agent can comprise any of a chemical spray and a high-voltage, low-current, electrical charge or electrical impulse.

The security device (100) and the computer processor (220a) are typically configured so that activation of the trigger switch (101) (or another switch 108) automatically:
 a) activates the at least one defensive mechanism (any of 214 or 103); and
 b) activates the electronic camera (102), obtaining at least one image of the field of view. This can also trigger the processor (220a) and the wireless transceiver (220b) to wirelessly transmit at least one image of the field of view (hopefully containing a suspect 250) to an external computerized device (302).
 c) Further, activation of the trigger switch or other switch can also automatically activate the noise generator (105). This noise generator will often be an electronic speaker or other electronic noisemaking device, usually driven by the computer processor (220a), and configured to produce at least one sound with an intensity exceeding 100 decibels.

In some embodiments, the noise generator (105) comprises an electronic audio speaker connected to the processor (220a). Here, the processor may be further configured to transmit preprogrammed sounds to the audio speaker (105). Any type of sound including human screams or other audio alarm signals may be played by the processor.

In some embodiments, the device's processor (220a) may be configured to be programmed or preset by connection to an external computerized device (302) such as a smartphone. This can enable the user to set various parameters, such as types of sonic alarms, personalize any radio alarm alerts, set phone numbers or internet addresses of local alert agencies, and the like. Further the functions of various switches, time delays between various actions, and the like may also be preset by the user, as desired.

As previously discussed, the device will typically have a handheld grip (124) with a grip axis (125), and a barrel (120) with a barrel axis (122). This handheld grip (124) is typically mounted to the barrel at an angle (126) usually between 0 and 90 degrees. This is often fixed, but as previously discussed, in some embodiments, can be configured to be user adjustable.

Thus, in some embodiments, the angle (126) is between 0 and 10 degrees, and the device is configured to look or act more like a baton, umbrella, flashlight, or club.

In other embodiments, the angle (126) is between 30 and 90 degrees, and the device is configured so that when the handheld grip (124) is gripped by a hand of a user and pointed by the user, the barrel axis (122) projects away from the user and towards a potential attacker FIG. 3, (250).

The barrel (120) is configured with a front region (130), distal from the handheld grip (124) so that the at least one defensive mechanism directionally projects the at least one defensive agent away from the front region and along the barrel axis (122) away from the handheld grip (124).

In some embodiments, the defensive mechanism is a chemical spray device (see FIG. 2A). This chemical spray device typically comprises:
d) a directional nozzle (214) mounted on the front region (130) of the barrel (120); and
e) a chemical cartridge (200) containing a defensive chemical, also connected to the directional nozzle (214), usually by a mechanically or electrically activated cartridge or aerosol valve (202).

The chemical spray device is typically configured so that activation of the trigger switch (101) ejects the defensive chemical from the cartridge (200), past aerosol valve (202) and out of the directional nozzle (214) towards a potential attacker (250). Various mechanisms may be used to do this, and examples of some of these mechanisms will be discussed shortly.

In a preferred embodiment, the defensive chemical comprises capsaicin, capsaicinoids, or other natural or synthetic pepper chemicals.

This capsaicin or other chemical may, for example, be suspended in a water propylene glycol solution and stored in pressurized aerosol cartridges. In this case, container (200) is a pressurized aerosol cartridge or aerosol container. In a preferred embodiment, device (100) will be configured so that container (200) is easy for the operator to exchange or replace. Thus cartridge 200 may be mounted in a device chamber via a snap-in mount, and optionally covered with a cover that is easy to slide back or remove.

The internal liquid storage volume and contents of the removable pepper spray containers may vary according to state laws. For example, in California, the pepper spray container should hold 2.5 ounces (71 grams) of fluid or less. Florida law restricts the internal fluid volume to 2 ounces or less, while New Jersey restricts this to only 0.75 ounces or less of fluid. Similarly, the concentration of the irritating chemical may also vary according to state laws. For example, to comply with New York laws, the pepper spray solution should contain no more than 0.67% capsaicin. By contrast, other states allow higher amounts. For example, Michigan allows up to 18% oleoresin capsicum, while Wisconsin allows a maximum concentration of 10%.

For commercial purposes, it may be useful to configure the device (100) so that it is initially distributed without container (200). The user can then obtain one or more containers (200) later that are compliant with the user's local laws.

In some embodiments, the device's at least one defensive mechanism may further comprise an electrical defense mechanism with at least two electrodes (103) configured on the front region (130) of the barrel (120). This electrical defensive mechanism is further configured with at a battery (226) and at least one transformer and/or capacitor (224). This transformer and/or capacitor is typically configured, upon activation of the trigger switch (101) or other switch (108) to deliver a high-voltage low-current charge of at least 20,000 volts to these two electrodes (103). For safety reasons, the current level is typically less than 3 milliamps. However other voltages and currents may be chosen, depending on local state laws. In some configurations, this will be factory set and cannot be reset by the user. In other configurations, this may be a user configurable option.

Although in some embodiments, the at least two electrodes (103) remain firmly attached to the front region (130) of the barrel (120) in use, other embodiments are also contemplated.

Figure 2B:
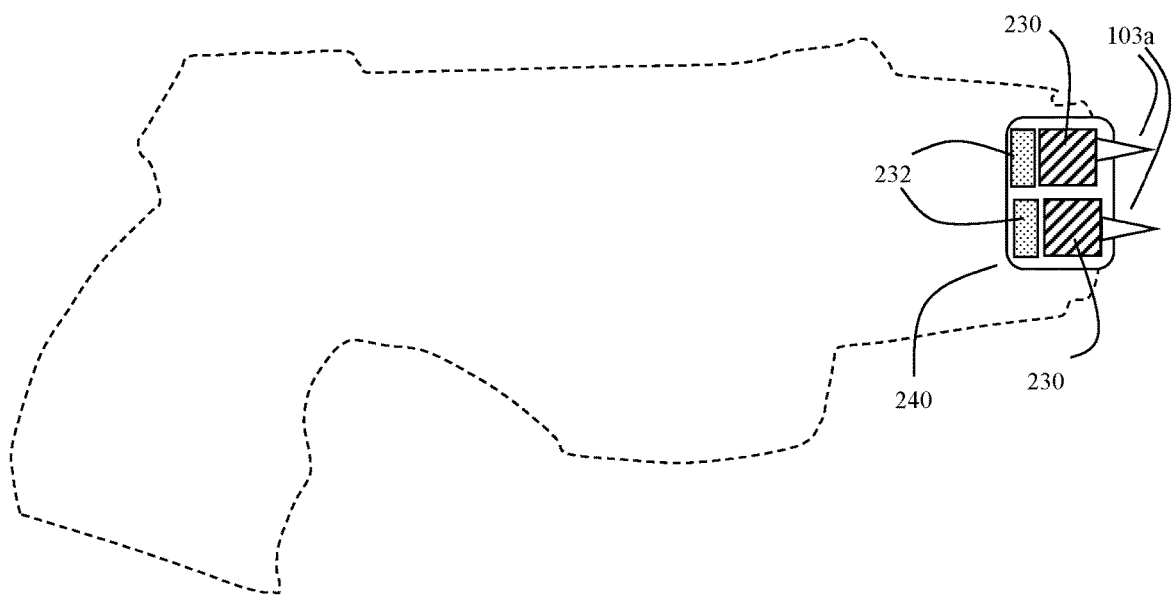
FIG. 2B shows an example of an alternative embodiment in which the "stun gun" electrodes are mounted on long, thin, electrical wires, and are configured to be forcefully expelled from the device when the trigger is activated. This enables the "stun gun" portion of the device to act at longer ranges, such as ten to 20 feet away from the front of the device.

FIG. 2B shows an example of an alternative embodiment in which the "stun gun" electrodes (103a) are mounted on long, thin, electrical wires (230—here shown coiled for storage), and are configured to be forcefully expelled from the device when the trigger is activated. This enables the "stun gun" portion of the device to act at longer ranges, such as ten to 20 feet away from the front of the device.

In particular, in some embodiments, the at least two electrodes may comprise electrical contacts (barbs 103a) configured to be forcefully expelled from the device upon activation of the trigger switch (101) or other switch (108). These barbs remain attached to the at least one transformer or capacitor (224) by long (often 10 to 20 feet long) electrical wires (230).

In some embodiments, the barbs and wires may be packaged in the form of electrically activated stun cartridges (240) packaged with an electrically activated explosive chemicals (232) or other electrically activated expulsion mechanism, such as a compressed gas, solenoid, spring, or the like. This configuration enables the device to act at a longer distance from the target. Examples of prior art versions of such replaceable stun cartridge, barb, and wire configurations may be seen Cover, U.S. Pat. No. 3,803,463, the entire contents of which are incorporated herein by reference. Other replaceable stun cartridge designs include Simson, U.S. Pat. No. 5,786,546, the entire contents of which are also incorporated herein by reference, may also be used.

Thus, in this embodiment, the at least two electrodes (103, 103a) may be configured as part of at least one removable stun cartridge (240). This at least one removable stun cartridge may comprise at least one electrically conducting barb (103a, acting as an electrode), at least ten feet of electrically conducting wire (230), and an electrically triggered expulsion mechanism (232). This electrically triggered expulsion (232) mechanism may be configured so that application of electrical energy (e.g., by a suitable microprocessor output port) to this expulsion mechanism forcefully expels the at least one electrically conducting barb (103a), attached to the device with at least ten feet of electrically conducting wire (230) away from the device's front region (130) and along the direction of the barrel axis (122). This enables electrical energy to be applied to the target (250) at a longer distance.

In a preferred embodiment, the battery (226) is a rechargeable battery, such as a lithium-ion or other type battery. In these embodiments, device (100) may be recharged by a standard charging cord, such as a USB (Universal Serial Bus) type cord. Here device 100 will usually have a suitable connector, such as a female USB connector (not shown), mounted on the surface. Other types of connectors and charging methods may also be used.

FIG. 2A shows an embodiment of the personal security device's chemical spray mechanism (solid lines). An embodiment of an alternative high voltage, low current "stun gun" mechanism is also shown (dotted lines).

Location of the stun switch: In some embodiments, where the device only has one defensive mechanism, then the trigger (101) can be configured to activate this one defensive mechanism. Here, the trigger mechanism may be coupled to the aerosol release valve (202) by a coupling mechanism (204). Alternatively, or additionally, the trigger mechanism may be coupled to an electrical switch (222). The trigger may be normally kept in a non-firing position by way of spring (204), trigger attachment point 206, and the trigger may swivel around post 208.

In some embodiments, the same trigger mechanism (101) may operate both defensive mechanisms. Here for example, pulling trigger (101) can release both the chemical spray and the electrical charge at the same or different times. Other options are also possible. In other embodiments, aerosol release valve (202) may be an electrically operated aerosol release valve, and the processor (220a) may be configured to first activate electrodes (103), and then release the chemical spray a short time (often 5-30 seconds) after. The order of activation of the defensive mechanisms and the time delay between the defensive mechanisms can be further configured to be user programmable Alternatively, in cases where the device has two defensive mechanisms, in some embodiments, it may be useful to use two different systems to activate these two defensive mechanisms. Here, for example, the defensive chemical may be activated by trigger (101). By contrast, the alternative method of administering a high voltage to electrodes (103) may be activated by a different switch, such as switch (108). In this embodiment, it may be useful to configure processor (220a) with an additional input port for switch (108) as well as for switch (222), so that the processor can distinguish between the two different inputs.

Additional safety devices, such as a safety switch (110), may be used to disarm the device when the device is not in use. Here safety switch (110) can do various functions. It can simply disarm the defensive portion of the device, but otherwise leave the alarm functions of the device active. Alternatively, the safety switch (110), or other switches such as a separate on/off switch (not shown), may be used to disarm and/or power down the device when not in use.

Electronic camera: In some embodiments, the device's electronic camera (102) is mounted on the barrel (120) and configured so that the camera's field of view encompasses the barrel axis (122) that extends away from the front region. The extent of the camera's field of view may vary, and in some embodiments, may even be adjustable by the user. If the field of view is too wide, then any attacker (250) may occupy to small a portion of the field of view for good coverage. However, if the field of view is too small, then the attacker (250) may be missed altogether. In general, about 45 degrees from either side, as well as top to bottom, around the barrel axis (122) is often adequate, but other configurations, ranging from "fish-eye" type 180-degree field of views, to "zoom" 20 degree or less field of views, may be used.

FIG. 3 shows an embodiment of some of the major electrical components of the personal security device. FIG. 3 also shows how the personal security device can use a short-range wireless transceiver, such as a Bluetooth transceiver (220b), to wirelessly transmit alarm information (300) to a nearby handheld computerized device (302) (such as a smartphone). This smartphone or other handheld computerized device can be configured (310) to annotate the alarm information with additional data, such as location (GPS) information (314) and then use the smartphone's longer range cellular transceiver to relay the annotated alarm (322) to local emergency response services (326).

To reduce costs, often the device's wireless transceiver (220b) may often be a short-range wireless transceiver (e.g., 3 to 300 feet), such as a Bluetooth or Wi-Fi, transceiver. In this case, the external computerized device (302) will typically comprise any of a smartwatch, smartphone, or tablet device, often selected to be easily carried by the user. There the external computerized device can be configured to relay any alarm message to a more remote recipient.

However other embodiments are possible. In some embodiments, the wireless transceiver (220b) may further comprise a cellular transceiver. Such cellular transceivers typically have ranges of several miles. In this case, a user-carried signal relay device (302) may not be needed. Instead, the external computerized device can be a cell tower (324) or other recipient device (326), often more than 300 feet from the user, that is configured to receive cellular transmissions from the wireless transceiver. Such options are also very feasible, but tend to be somewhat more expensive.

In some cost effective and potentially popular embodiments, the wireless transceiver (220b) comprises any of a Bluetooth or Wi-Fi transceiver, and the external computerized device (302) comprises any of a smartwatch, smartphone, or cellular equipped tablet device. Here the device processor (220a) is configured to automatically use wireless transceiver (220a) to automatically transmit alarm information to the external computerized device (302) (e.g., user smartphone) when either:

f) the trigger (101) and/or a stun switch (108 or 222) is activated; and/or g) the emergency call button (109), located on any of the handheld grip (124) or the barrel (120), is activated by the user.

In this embodiment, the external computerized device (302) (e.g., smartphone) comprises a cellular transceiver. Further, the external computerized device (302) is configured (310) (often by a software app) to use the alarm information (300, from the handheld security device) and the smartphone's cellular transceiver to automatically transmit (322) at least one distress message to an emergency contact (326). See, for example, FIG. 3 (300, 302, 322, 324, and 326). A flow chart showing how this app can operate is also shown in FIG. 3 (310).

In a preferred embodiment, the external computerized device (302) further comprises a GPS receiver producing GPS location information. In this embodiment, the external computerized device (302) may be configured (usually by a software app 310, 314) to append this GPS location information to the at least one distress message (300), before forwarding the distress message on (322, 324) to the ultimate recipient (326).

Further, the external computerized device (302) may also be configured to append any at least one image (or video) transmitted by security device (100) to this at least one distress message (310). Note that in some embodiments, the user may have discretely activated the security device to take images or video before any actual assault or 911 message was transmitted. Here, the external computerized device may be configured to search its memory for any previously transmitted images within a defined interval (say 1-5 minutes of an assault alert), and may append any previous images or video to the alert message as well.

In alternative embodiments, when the security device's wireless transceiver (220b) comprises a cellular transceiver, the security device's processor (220a) may be configured to direct the security device's cellular transceiver to automatically (and directly) call an emergency contact (326). As before, this can occur when either:

h) the trigger (101) and/or stun switch (108 or 222) is activated; or i) an emergency call button (109), located on any of the handheld grip (124) or barrel, (120) is activated by the user.

Thus, in use, the user may, for example, walk outside with their smartphone in their pocket. The user may have the security device (100) in their pockets as well, or alternatively carry the security device in their hand. In the event of an attack, the user need only activate the security device, and the security device and smartphone can then carry out the other defense and alert steps automatically.

Bluetooth® is a trademark of the Bluetooth SIG, Inc.

The invention claimed is:

1. A handheld personal security device comprising:
a computer processor, trigger switch, noise generator, device wireless transceiver, at least one directional defensive mechanism, and an electronic camera having a field of view;
wherein said processor is configured to use said wireless transceiver to transmit at least one image to an external computerized device comprising a cellular transceiver;
said defensive mechanism configured to directionally project at least one defensive agent in the same direction as said field of view;
said at least one defensive agent comprising m at least a high-voltage low-current charge;
said security device and said computer processor configured so that activation of said trigger switch automatically:
a) activates said at least one defensive mechanism;
b) activates said electronic camera, obtaining at least one image of said field of view, and triggering said processor and said wireless transceiver to wirelessly transmit said at least one image to said external computerized device;
c) activates said noise generator, said noise generator configured to produce at least one sound with intensity exceeding 100 decibels;
wherein said device has a handheld grip with a grip axis, and a barrel with a barrel axis, said handheld grip mounted to said barrel at an angle between 0 and 90 degrees; and
wherein said barrel is configured with a front region so that said at least one directional defensive mechanism projects said at least one defensive agent away from said front region and along said barrel axis away from said handheld grip.

2. The device of claim 1, wherein at least one of said at least one defensive mechanism further comprises a chemical spray device comprising:
d) a directional nozzle mounted on said front region of said barrel
e) a chemical cartridge containing a defensive chemical, also connected to said directional nozzle;
wherein said chemical spray device is configured so that activation of said trigger switch ejects said defensive chemical from said chemical cartridge, and out of said directional nozzle.

3. The device of claim 2, wherein said defensive chemical comprises capsaicin, capsaicinoids, or other natural or synthetic pepper chemicals.

4. The device of claim 1, wherein at least one of said at least one defensive mechanism further comprises at least two electrodes configured on said front region of said barrel;
said at least one defensive mechanism is further configured with fat a battery and at least one transformer or capacitor configured to deliver a high-voltage low-current charge of at least 20,000 volts, but at a current level of less than 3 milliamps, to said at least two electrodes upon activation of said trigger switch.

5. The device of claim 4, wherein said at least two electrodes are configured to remain continually affixed to said front region of said barrel.

6. The device of claim 4, wherein said at least two electrodes are configured as part of a removable stun cartridge;
said removable stun cartridge comprising two electrically conducting barbs, at least ten feet of electrically conducting wire, and an electrically triggered expulsion mechanism;
said electrically triggered expulsion mechanism configured so that application of electrical energy to said expulsion mechanism then forcefully expels said two electrically conducting barbs and said at least ten feet of electrically conducting wire away from said front region.

7. The device of claim 4, wherein said battery supplies power to said at least one transformer or capacitor configured to deliver a high-voltage low-current charge of at least 20,000 volts, further comprising a battery charging connector configured so that application of electrical energy to said battery charging connector charges said battery.

8. The device of claim 1, wherein said electronic camera is mounted on said barrel and configured so that said field of view encompasses said barrel axis that extends away from said front region.

9. The device of claim 1, wherein said wireless transceiver comprises any of a Bluetooth or Wi-Fi transceiver, and said external computerized device comprises any of a smartwatch, smartphone, or tablet phone; or
wherein said wireless transceiver further comprises a cellular transceiver, and said external computerized device is configured to receive cellular transmissions from said wireless transceiver.

10. The device of claim 1, wherein said wireless transceiver comprises any of a Bluetooth or Wi-Fi transceiver, and said external computerized device comprises any of a smartwatch, smartphone, or tablet phone;
wherein said processor is configured to automatically use said wireless transceiver to automatically transmit alarm information to said external computerized device when:
an emergency call button, located on any of said handheld grip or said barrel, is activated;
and
said external computerized device is configured to use said alarm information and said cellular transceiver to automatically transmit at least one distress message to an emergency contact.

11. The device of claim 10, wherein said external computerized device further comprises a GPS receiver producing GPS location information, and said external computerized device is configured to append said GPS location information to said at least one distress message.

12. The device of claim 10, wherein said external computerized device is configured to append said at least one image to 112 (said at least one distress message.

13. The device of claim 1, wherein said wireless transceiver comprises a cellular transceiver, and said processor is configured to direct said cellular transceiver to automatically call an emergency contact when:
h) said trigger is activated; or
said wireless transceiver comprises a cellular transceiver, and said processor is configured to direct said cellular transceiver to automatically call an emergency contact when
i) an emergency call button, located on any of said handheld grip or said barrel, is activated.

14. The device of claim 1, wherein said noise generator comprises an audio speaker, and said processor is configured to transmit preprogrammed sounds to said audio speaker, said sounds comprising any of human screams or other audio alarm signals.

15. The device of claim 1, wherein said angle is between 0 and 10 degrees, and said device is configured to look like a baton, flashlight, umbrella, or club.

16. The device of claim 1, wherein said angle is user adjustable between 30 and 90 degrees, and said device is configured so that when said handheld grip is gripped by a hand of a user and pointed by said user, said barrel axis projects away from said user and towards a potential attacker.

17. A handheld personal security device comprising:
a computer processor, trigger switch, noise generator, wireless transceiver, at least one directional defensive mechanism, and an electronic camera having a field of view;
wherein said processor is configured to use said wireless transceiver to transmit information to an external computerized device;
said defensive mechanism configured to directionally project at least one defensive agent in the same direction as said field of view;
said at least one defensive agent comprising any of a chemical spray and a high-voltage low-current charge;
said security device and said computer processor configured so that activation of said trigger switch automatically:
a) activates said at least one defensive mechanism;
b) activates said electronic camera, obtaining at least one image of said field of view, and triggering said processor and said wireless transceiver to wirelessly transmit said at least one image to said external computerized device;
c) activates said noise generator, said noise generator configured to produce at least one sound with intensity exceeding 100 decibels;
wherein said device has a handheld grip with a grip axis, and a barrel with a barrel axis, said handheld grip mounted to said barrel at an angle between 0 and 90 degrees; and
wherein said barrel is configured with a front region so that said at least one directional defensive mechanism projects said at least one defensive agent away from said front region and along said barrel axis away from said handheld grip;
wherein said processor is configured to automatically use said wireless transceiver to automatically transmit alarm information to said external computerized device when
d) an emergency call button, located on any of said handheld grip or said barrel, is activated;
wherein said external computerized device comprises a cellular transceiver and a GPS receiver; and
wherein said external computerized device is configured to use said alarm information and said cellular transceiver to automatically transmit at least one distress message comprising GPS location information and at least one distress image to an emergency contact.

18. The device of claim 17, said at least one defensive mechanism is one defensive mechanism comprising at least two electrodes configured on said front region of said barrel;
said one defensive mechanism is further configured with at a battery and at least one transformer or capacitor configured to deliver a high-voltage low-current charge of at least 20,000 volts, but at a current level of less than 3 milliamps, to said at least two electrodes upon activation of said trigger switch.

19. The device of claim 18, wherein said at least two electrodes are configured as part of a removable stun cartridge;
said removable stun cartridge comprising two electrically conducting barbs, at least ten feet of electrically conducting wire, and an electrically triggered expulsion mechanism;
said electrically triggered expulsion mechanism configured so that application of electrical energy to said expulsion mechanism then forcefully expels said two electrically conducting barbs and said at least ten feet of electrically conducting wire away from said front region.

20. The device of claim 17, wherein said angle is user adjustable between 30 and 90 degrees, and said device is configured so that when said handheld grip is gripped by a hand of a user and pointed by said user, said barrel axis projects away from said user and towards a potential attacker.

* * * * *